(12) United States Patent
Meisen

(10) Patent No.: US 6,562,533 B2
(45) Date of Patent: May 13, 2003

(54) MAGNETITES AND THEIR USE IN PRODUCING TONERS

(75) Inventor: Ulrich Meisen, Kall (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/944,880

(22) Filed: Aug. 31, 2001

(65) Prior Publication Data

US 2002/0115007 A1 Aug. 22, 2002

(30) Foreign Application Priority Data

Sep. 8, 2000 (DE) .......................... 100 44 397

(51) Int. Cl.$^7$ .......................... G03G 9/083; C01G 49/08
(52) U.S. Cl. .............. 430/106.2; 252/62.59; 252/62.56
(58) Field of Search .......................... 430/106.1, 106.2, 430/111.41; 252/62.56, 62.59; 423/632

(56) References Cited

U.S. PATENT DOCUMENTS

| | | | |
|---|---|---|---|
| 802,928 | A | 10/1905 | Fireman |
| 3,970,738 | A | 7/1976 | Matsui et al. ............... 423/140 |
| 4,753,680 | A | 6/1988 | Burow et al. ............... 106/304 |
| 6,143,194 | A * | 11/2000 | Körschen et al. ........ 252/62.56 |
| 6,280,649 | B1 | 8/2001 | Meisen ................... 252/62.59 |

FOREIGN PATENT DOCUMENTS

| | | |
|---|---|---|
| DE | 32 09 469 | 9/1982 |
| DE | 197 02 431 | 7/1998 |
| GB | 1535899 | 12/1978 |
| GB | 2040904 | 9/1980 |

OTHER PUBLICATIONS

Chemical Abstracts, vol. 121, No. 10, 1993, Columbus, OH, US; abstract No. 112617, Ying Liu et al, XP002185226, "Preparation of Superfine Fe304 Cubic Powders", Zusammenfassung & J. Beijing Inst. Technol. (Engl. Ed.), Bd. 2, Nr. 1, 1993, Seiten 98–102.

Chemical Abstracts, vol. 70, No. 26, 1969, Columbus, OH, US; abstract No. 116696, K. Nakano, "Manufacturing of Fe0.Fe2O3", XP002185227, Zusammenfassung, & JP 43 026386 B (Nakano Kenji) Nov. 13, 1968.

* cited by examiner

*Primary Examiner*—John Goodrow
(74) *Attorney, Agent, or Firm*—Godfried R. Akorli; Thomas W. Roy

(57) ABSTRACT

This invention relates to magnetite particles with a mean particle size of 0.1 to 0.3 $\mu$m, a specific surface area of 6 to 9 m$^2$/g, a coercive force of 80 to 110 Oe, a residual magnetization of 13 to 20 nTm$^3$/g, a pH of 7 to 10 and a bulk density of 0.6 to 0.9 g/cm$^3$, by heating an aqueous solution of an alkaline component under inert gas, to a precipitation temperature of 65–85° C., adding iron (II) and iron (III) components and oxidizing the suspension with an oxidizing agent at a speed of 7–25 mol % Fe (II)/h.

17 Claims, No Drawings

MAGNETITES AND THEIR USE IN PRODUCING TONERS

BACKGROUND OF THE INVENTION

The invention relates to magnetite particles, processes for the production thereof and the use thereof in the production of toners.

Magnetites in particle form which are produced by a precipitation process from aqueous solutions are known. Fireman obtained a patent (US-A 8029 28) as early as 1905 in which he describes the production of magnetite by precipitating iron (II) sulphate with an alkaline component and subsequent oxidation with air. Starting from this basic invention, numerous patents for producing magnetites by the precipitation process have since been granted.

These materials were initially used for producing paints of all types. The particular advantage of magnetites compared to organic painting materials and carbon black lies in its much better weather resistance, so paints of this type can also be used outside. Precipitated magnetites are also used for dying concrete shaped parts, such as paving stones or concrete roofing tiles. For some time, magnetites have also been used in electrophotography for producing toners. Magnetites produced by the precipitation process are particularly preferred for producing toners for copying machines with single component toners. The magnetic toner used for this must have various general properties. With continuing development and improvement of copying machines and printers, the demands on the magnetic toner and therefore on the magnetite used for this are constantly increasing. The latest printer generation achieves a resolution of more than 400 dpi (dots per inch), which has led to the development of fine particle toner with very narrow particle size distribution. The magnetites required for this consequently have to have a very narrow particle size distribution.

A specific particle size is also necessary for a uniform distribution of the magnetite particles in the finished toner. The magnetites themselves have to have adequately high electrical resistance to stabilize the latent image during electrostatic transmission. The coercive force, saturation magnetization and above all the residual magnetization need to be in the correct ratio to the field strengths prevailing in the machine. It is therefore necessary to develop toners and thus magnetites with special properties for every class of copying machines.

It is therefore the object of the present invention to provide a process for producing a fine particle, cube-shaped low-Si magnetite with a mean particle size of 0.1 to 0.3 $\mu$m. Low-Si cube-shaped magnetites of this type are particularly suitable for use in laser printers of the latest generation (e.g. HP Laserjet 4000). For this purpose, a particular combination of properties is required of the printer producers:

coercive force approximately 100 Oe
residual magnetization 13 to 20 nTm$^3$/g
cubed shape
particle size 0.1 to 0.3 $\mu$m
BET surface area approximately 7 m$^2$/g
pH value (of the powder) neutral to slightly alkaline
bulk density in the medium range (for magnetites) i.e. just under 1 g/cm$^3$ Magnetites with these properties are just as suited for use in dyes for coloring paper, plastics material, paints, fibres and concrete, as for producing magnetic toners.

Pure precipitated magnetites without the addition of foreign elements can be produced discontinuously according to DE-A 3 209 469 or continuously according to DE-A 2 618 058. In the above-mentioned patents, FeSO$_4$ is used as the iron (II) salt. However, it is also possible to use any soluble iron (II) salt for producing a magnetite by the precipitation process. The use of FeCl$_2$, as described in DE-A 3 004 718 should be particularly considered, here. The use of FeSO$_4$ or FeCl$_2$ has the advantage that both materials can be obtained very economically in large quantities as waste materials from the iron processing industry. Apart from the most frequently used sodium hydroxide, CaO or CaCO$_3$ (DE-A 3 004 718), ammonia (DE-A 2 460 493), or Na$_2$CO$_3$, MgCO$_3$ or MgO (EP-A 0 187 331) can be used as precipitating agent. Air is usually used as oxidizing agent. However, processes for oxidizing with nitrates are also described (DD-A 216 040 and DD-A 284 478).

The production of magnetites is usually described without doping and is particularly well described by Kiyama (Bull Chem. Soc. Japan, 47(7), 1974, 1646–50). However, a precise instruction as to how the magnetites required in the object are to be produced, cannot be found here.

The particle size and particle shape of the magnetites can be controlled by the precipitation pH. With high pH values and correspondingly low values for the Fe (II)/NaOH ratio (less than 0.47) octahedrons are obtained. These particles have relatively the highest coercive force and residual magnetizm. Cubic particles occur in a very narrow range of the Fe (II)/NaOH ratio, at about 0.47 to 0.49 depending on temperature.

By suitable selection of the processing parameters, it is possible to adjust the other required properties. A further important influencing factor in producing precipitated magnetites is the oxidizing agent. In the case of atmospheric oxygen, the efficiency is dependent on the distribution of air bubbles in the suspension. The tendency to form thermodynamically more stable goethite generally increases with the increasing air flow. If the production of fine particle magnetites is desired, it is necessary to develop a process which takes into consideration all the above-mentioned facts. It is also important that possible additives (e.g. Si or other metals) can long delay the tendency to form magnetite.

An object of the invention is to produce a magnetite which is specifically suitable for use in fine particle single-component toners. A magnetite of this type, apart from a small particle size (approximately 0.2 $\mu$m), must have a precisely specified residual magnetizm, a precisely defined coercive force and an adequately high temperature stability. The magnetite must also have a narrow particle size distribution.

This complex object was able to be achieved by the provision of the process according to the invention. It comprises the following stages:

1. Initial introduction of an alkaline component with inert gas passed through
2. Heating this mixture while stirring to the precipitation temperature
3. Metered addition of an iron (II) component
4. Optionally heating to reaction temperature
5. Oxidizing with an oxidizing agent up to an Fe (III) content of more than 65 mol %.

SUMMARY OF THE INVENTION

The invention relates to a process for producing a low-Si magnetite of cubic habit, with a mean particle size (determined by transmission electron microscope reproductions with 33,000 fold enlargement) of 0.1 to 0.3 $\mu$m, a specific surface area of 6 to 9 m$^2$/g, a coercive force (measured at a field strength of 5,000 Oe=397.9 KA/m) of 80 to 110 Oe (6,366 KA/m to 8.754 KA/m), a residual magnetization of 13 to 20 $nTm^3/g$, a pH of 7 to 10 and a bulk density of 0.6 to 0.9 $g/cm^3$, by a.) forming an aqueous solution of an alkaline component under inert gas, b.) heating to a precipitation temperature of 65–85° C., c.) adding an iron (II) component with an Fe concentration of 55 to 105 g/l Fe and an Fe (III) content of 0.2 to 1.5 mol % Fe (III) at a speed of 0.25–1.5 mol Fe/h*mol NaOH up to a pH of the suspension measured at the precipitation temperature of 8.0–9.7 and d.) oxidizing the suspension with an oxidizing agent at a speed of 7–25 mol % Fe (II)/h to an Fe (III) content of 65–75 mol % Fe (III).

The invention also relates also to a process for producing a low-Si magnetite of cubic habit, with a mean particle size (determined by transmission electron microscope reproductions with 33,000 fold enlargement) of 0.1 to 0.3 μm, a specific surface area of 6 to 9 $m^2/g$, a coercive force (measured at a field strength of 5,000 Oe=397.9 KA/m) of 80 to 110 Oe (6,366 KA/m to 8.754 KA/m), a residual magnetization of 13 to 20 $nTm^3/g$, a pH of 7 to 10 and a bulk density of 0.6 to 0.9 $g/cm^3$, by a.) forming an aqueous solution of an alkaline component under inert gas, b.) heating to a precipitation temperature of 65–85° C., c.) adding an iron (II) component with an Fe concentration of 55 to 105 g/l Fe and an Fe (III) content of 0.2 to 1.5 mol % Fe (III) at a speed of 0.25–1.5 mol Fe/h*mol NaOH up to a pH of the suspension measured at the precipitation temperature of 8.0–9.7, d.) oxidizing the suspension with an oxidizing agent at a speed of 7–25 mol % Fe (II)/h to an Fe (III) content of 65–75 mol % Fe (III), and e.) drying the aqueous slurry in a dryer.

DETAILED DESCRIPTION OF THE INVENTION

Preferable parameters for the steps of the invention are:

b. a precipitation temperature of 70–80° C., c. an iron (II) component with an Fe concentration of 71 to 97 g/l Fe, c.) an Fe (III) content of 0.5 to 1.0 mol % Fe (III), c.) the pH value of the suspension, measured at the precipitation temperature, is 8.5–9.5 and d.) the suspension is oxidized with an oxidizing agent at a speed of 11–23 mol % Fe (II)/h.

An alkali metal hydroxide, an alkaline-earth metal hydroxide, an alkaline-earth metal oxide, an alkali metal carbonate, $MgCO_3$ or ammonia can be used as the alkaline component. Iron (II) is typically used in the form of a water-soluble Fe (II) component, $FeSO_4$ or $FeCl_2$ being particularly preferably used. However, it is also possible to use other water-soluble Fe (II) compounds if these are at comparable prices. Atmospheric oxygen, pure oxygen, $H_2O_2$, alkali metal chlorates (V), alkali metal chlorates (VII), chlorine or nitrates can be used as oxidizing agent. Atmospheric oxygen, pure oxygen, $H_2O_2$ or sodium nitrate are particularly preferably used. During the oxidation care is to be taken that the speed of oxidation is not selected too high, to avoid formation of undesired α-FeOOH as a second compound. The speed of oxidation should be between 7 and 25 mol % Fe (II)/h. This oxidation relates to a stoichiometric magnetite with 33.3 mol % Fe (II).

To produce a pure Fe (II) solution of a magnetite of this type only 66.6 % of the Fe (II) has to be oxidized to Fe (III). If a charge with 10 mol Fe (II) sulphate is oxidized to magnetite in 5 h, a speed of oxidation of 20 mol % Fe (II)/h is obtained, as the Fe (II) quantity to be oxidized is 6.66 mol.

A particularly preferred embodiment for producing the claimed magnetite is as follows:

Sodium hydroxide solution with a 300 g NaOH content per liter is introduced first into a discontinuous stirrer vessel while stirring and passing through inert gas. Heating is then carried out to the desired precipitation temperature. When the precipitation temperature is reached, precipitation is carried out with an iron (II) salt solution (e.g. $FeSO_4$) until the desired pH value is reached. The precipitation temperature is between 65 and 85° C., preferably between 70 and 80° C. $FeSO_4$ or $FeCl_2$ solution is used as the iron (II) component. This solution has an Fe content of 55–105 g Fe/l preferably 71–97 g Fe/l. The Fe (III) content of the solution is between 0.2 and 1.5 mol %, preferably between 0.5 and 1.0 mol % Fe (III). The desired pH value is between 8.0 and 9.7, preferably between 8.5 and 9.5.

The Fe (II) component is added at a rate of 0.25 to 1.5 mol Fe/h*mol NaOH. After addition of the quantity of Fe (II) component is completed, heating takes place to the reaction temperature. In many cases the precipitation temperature and reaction temperature are identical so a particular heating stage is not necessary. Once the reaction temperature has been reached, treatment with inert gas is ended and addition of the oxidizing agent is begun. In the case of treatment with air, air is introduced below the stirrer via a gas feed device. The chosen speed of oxidation is between 7 and 25 mol % Fe (II)/h, preferably between 11 and 23 mol % Fe (II)/h.

The properties of the finished magnetites are measured according to the methods described below:

1. The magnetic values (coercive force, specific saturation magnetization, specific residual magnetization), are measured by the sample vibrating magnetometer (producer Bayer AG, DE) at 5,000 Oe=397.9 KA/m field strength.

2. The BET surface area is measured according to DIN 66 131.
   Gas mixture: 90% He, 10% $N_2$, measuring temperature: 77.4 K Baking at 140° C., 60 minutes.

3. Element analysis Si
   Si is determined by spectral analysis by means of ICP-OES.

4. Element analysis Fe, Fe (II), Fe (III)
   Determinations according to DIN 55 913. The Fe (II) content is determined by titration with $KMnO_4$ by means of a memotitrator (Mettler DL-70). Fe (III) is similarly determined with $TiCl_3$. The total iron content is calculated from the two individual values and the weighted-in quantity. The content in the two measured results is determined daily.

5. Particle shape, particle size
   The particle size and shape are assessed from a transmission electron microscope (TEM) reproduction with 33,000-fold enlargement.

6. Determination of the bulk density
   The bulk density is determined according to EN ISO 787.

7. Determination of the pH value (of the finished powder)
   Determined according to EN ISO 787-9.

Low-Si magnetites in the sense of the invention are those with an Si content of a maximum of 0.025 wt. %, preferably a maximum of 0.0025 wt. %, and particularly preferably a maximum of 0.001 wt. %.

EXAMPLES

Example 1

8,000 kg of sodium hydroxide solution with a content of 300 g/l, corresponding to 200 kmol NaOH, were put into a stirrer vessel with 100 m³ useful volume. After switching on the nitrogen feed and the stirrer, the solution was heated to 75° C. In 70 minutes 57.5 m³ iron (II) sulphate solution with a content of 92.3 g Fe/l were pumped. The speed of precipitation was accordingly 0.407 mol Fe/h*mol NaOH. The Fe (III) content of the iron sulphate solution was 0.53 mol % Fe (III). After the addition was completed a pH value of 9.2 (measured at 75° C.) was produced. The nitrogen feed was then stopped and gas was supplied via the gas feed ring below the stirrer at 450 m³/h. Gas treatment was interrupted after 270 min after an Fe (III) content of 69.4 mol % was reached. The speed of oxidation was accordingly 22.22 mol % Fe (II)/h.

Once the reaction had been completed, the suspension was filtered, thoroughly washed with demineralised water and dried by direct heating by means of natural gas in a disc-type spray dryer. Before drying, the suspension was slurried with demineralised water to 350 g/l Fe₃O₄ and dried with a throughput of 1,500 liters per hour. The gas output temperature was adjusted to 115° C. by adjusting the burner. The mean residence time was 2 seconds. The powder obtained was ground in an impact crusher.

The magnetite obtained had the following properties:

| | |
|---|---|
| Si content: | 0.001 wt. % Si |
| Coercive force: | 103 Oe = 8.19 KA/m |
| Specific residual magnetization: | 193 Gcm³/g = 19.3 nTm³/g |
| Specific saturation magnetization: | 1091 Gcm³/g = 109.1 nTm³/g |
| Particle size: | 0.2 μm |
| BET surface area: | 8.2 m²/g |
| pH value: | 8.8 |
| Bulk density: | 0.72 g/cm³ |

Example 2

8,000 kg of sodium hydroxide solution with a content of 300 g/l, corresponding to 200 kmol NaOH, were put into a stirrer vessel with 100 m³ useful volume. After switching on the nitrogen feed and the stirrer, the solution was heated to 75° C. In 65 minutes 58.43 m³ iron (II) sulphate solution with a content of 90.9 g Fe/l were pumped. The speed of precipitation was accordingly 0.444 mol Fe/h*mol NaOH. The Fe (III) content of the iron sulphate solution was 0.62 mol % Fe (III). After the addition was completed a pH value of 9.4 (measured at 75° C.) was produced. The nitrogen feed was then stopped and air was supplied via the gas feed ring below the stirrer at 450 m³/h. Gas treatment was interrupted after 300 min after an Fe (III) content of 70.5 mol % was reached. The speed of oxidation was accordingly 20 mol % Fe (II)/h.

Once the reaction had been completed, the suspension was filtered, thoroughly washed with demineralised water and dried by direct heating by means of natural gas in a disc-type spray dryer. Before drying, the suspension was slurried with demineralised water to 350 g/l Fe₃O₄ and dried with a throughput of 1,500 liters per hour. The gas output temperature was adjusted to 115° C. by adjusting the burner. The mean residence time was 2 seconds. The powder obtained was ground in an impact crusher.

The magnetite obtained had the following properties:

| | |
|---|---|
| Si content: | 0.005% by wt Si |
| Coercive force: | 92 Oe = 7.32 KA/m |
| Specific residual magnetization: | 153 Gcm³/g = 15.3 nTm³/g |
| Specific saturation magnetization: | 1140 Gcm³/g = 114 nTm³/g |
| Particle size: | 0.2 μm |
| BET surface area | 8.0 m²/g |
| pH value: | 7.5 |
| Bulk density: | 0.73 g/cm³ |

Example 3

7,400 kg of sodium hydroxide solution with a content of 300 g/l, corresponding to 185 kmol NaOH, were put into a stirrer vessel with 100 m³ useful volume. After switching on the nitrogen feed and the stirrer, the solution was heated to 75° C. In 103 minutes 52.0 m³ iron (II) sulphate solution with a content of 96.7 g Fe/l were pumped. The speed of precipitation was accordingly 0.282 mol Fe/h*mol NaOH. The Fe (III) content of the iron sulphate solution was 0.99 mol % Fe (III). After the addition was completed a pH value of 8.0 (measured at 75° C.) was produced. The nitrogen feed was then stopped and air was supplied via the gas feed ring below the stirrer at 450 m³/h. Gas treatment was interrupted after 540 min after an Fe (III) content of 71.0 mol % was reached. The speed of oxidation was accordingly 11.11 mol % Fe (II)/h.

Once the reaction had been completed, the suspension was filtered, thoroughly washed with demineralised water and dried by direct heating by means of natural gas in a disc-type spray dryer. Before drying, the suspension was slurried with demineralised water to 350 g/l Fe₃O₄ and dried with a throughput of 1,500 liters per hour. The gas output temperature was adjusted to 120° C. by adjusting the burner. The mean residence time was 1 second. The powder obtained was ground in an impact crusher.

The magnetite obtained had the following properties:

| | |
|---|---|
| Si content: | 0.011 wt. % Si |
| Coercive force: | 94 Oe = 7.48 KA/m |
| Specific residual magnetization: | 160 Gcm³/g = 16 nTm³/g |
| Specific saturation magnetization: | 1090 Gcm³/g = 109 nTm³/g |
| Particle size: | 0.2 μm |
| BET surface area: | 7.1 m²/g |
| pH value: | 8.7 |
| Bulk density: | 0.84 g/cm³. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing magnetite of cubic habit having a maximum Si content of 0.025 wt. %, a mean particle size (determined by transmission electron microscope reproductions with 33,000 fold enlargement) of 0.1 to 0.3 μm, a specific surface area of 6 to 9 m²/g, a coercive force (measured at a field strength of 5,000 Oe=397.9 KA/m) of 80 to 110 Oe (6,366 KA/m to 8.754 KA/m), a residual magnetization of 13 to 20 nTm³/g, a pH of 7 to 10 and a bulk density of 0.6 to 0.9 g/cm³, comprising a.) forming an aqueous solution of an alkaline component under inert gas, b.) heating to a precipitation temperature of 65–85° C., c.) adding an iron (II) component with an Fe concentration of 55 to 105 g/l Fe and an Fe (III) content of 0.2 to 1.5 mol % Fe (III) at a speed of 0.25–1.5 mol Fe/h*mol NaOH up to a pH of the suspension measured at the precipitation temperature of 8.0–9.7 and d.) oxidizing the suspension with an oxidizing agent at a speed of 7–25 mol % Fe (II)/h to an Fe (III) content of 65–75 mol % Fe (III).

2. The process of claim 1, wherein b.) the precipitation temperature is 70–80° C.

3. The process of claim 1, wherein c.) the iron (II) component has a concentration of 71 to 97 g/l Fe.

4. The process of claim 1, wherein the iron (III) content is 0.5 to 1.0 mol % Fe (III).

5. The process of claim 1, wherein the pH of the suspension measured at the precipitation temperature is 8.5–9.5.

6. The process of claim 1, wherein the speed of oxidation is 11–23 mol % Fe (II)/h.

7. The process of claim 1, wherein the alkaline component is selected from the group consisting of ammonia, alkali metal hydroxides, alkaline-earth metal hydroxides, alkali metal carbonates and $MgCO_3$.

8. The process of claim 1, wherein oxidizing agent is atmospheric oxygen, $H_2O_2$, chlorine, an alkali metal chlorate or nitrate.

9. The process of claim 1, further comprising e.) drying the aqueous slurry in a dryer.

10. The process of claim 9, wherein a spray dryer is used as drying apparatus.

11. The process of claim 9 wherein the drying temperature measured at the gas outlet of the dryer is approximately 100 to 150° C.

12. The process of claim 9 wherein the drying temperature measured at the gas outlet of the dryer is approximately 110 to 130° C.

13. The process of claim 9, wherein the mean residence time during drying is less than 5 seconds.

14. A toner comprising a magnetite obtained by claim 1.

15. A toner comprising a magnetite obtained by claim 9.

16. A composition of matter comprising a magnetite obtained by the process of claim 1 and a material selected from the group consisting of concrete, plastics materials, paper, paints and varnishes.

17. A composition of matter comprising a magnetite obtained by the process of claim 9 and a material selected from the group consisting of concrete, plastics materials, paper, paints and varnishes.

* * * * *